United States Patent
McMahan et al.

(10) Patent No.: US 7,690,163 B2
(45) Date of Patent: Apr. 6, 2010

(54) POLYMERIC DOOR FACING WITH TEXTURED INTERIOR SURFACE, AND METHOD OF FORMING SAME

(75) Inventors: David McMahan, Burns, TN (US); James Pfau, Kirkland, IL (US); Tamra Williams, Hattiesburg, MS (US); Liqun Xu, Aurora, IL (US); Thomas Ruffin, Laurel, MS (US)

(73) Assignee: Masonite Corporation, Tampa, FL (US)

( * ) Notice: Subject to any disclaimer, the term of this patent is extended or adjusted under 35 U.S.C. 154(b) by 948 days.

(21) Appl. No.: 11/438,701

(22) Filed: May 23, 2006

(65) Prior Publication Data

US 2006/0272278 A1    Dec. 7, 2006

Related U.S. Application Data

(60) Provisional application No. 60/683,320, filed on May 23, 2005.

(51) Int. Cl.
*E06B 7/00* (2006.01)
(52) U.S. Cl. .................. 52/309.1; 52/455; 52/784.1; 52/789.1
(58) Field of Classification Search ... 52/309.1–309.17, 52/455–458, 784.1–784.16, 789.1
See application file for complete search history.

(56) References Cited

U.S. PATENT DOCUMENTS 3,773,709 A * 11/1973 Boutsicaris .............. 428/300.7
3,879,318 A * 4/1975 Forsyth ...................... 523/508
5,074,087 A   12/1991 Green
5,537,789 A * 7/1996 Minke et al. ............... 52/309.9
5,932,314 A   8/1999 West
6,952,903 B2 * 10/2005 West et al. ................. 52/309.9
7,208,220 B2 * 4/2007 Yamasaki et al. ......... 428/296.4
7,367,166 B2 * 5/2008 Luetgert et al. ............ 52/784.1

FOREIGN PATENT DOCUMENTS

GB      2 236 346      4/1991
WO      WO 03/089207   10/2003

* cited by examiner

*Primary Examiner*—Richard E Chilcot, Jr.
*Assistant Examiner*—Matthew J Smith
(74) *Attorney, Agent, or Firm*—Berenato & White, LLC

(57) ABSTRACT

The present invention is directed to a door facing formed from a polymeric composite material. The door facing has a first major surface intended to be interiorly disposed and a second major surface intended to be exteriorly disposed. At least a portion of the first major surface is to be subjected to thermal and mechanical stresses during door assembly. The first major surface has a textured pattern in the portion to be subjected to thermal and mechanical stresses. The textured pattern includes a plurality of spaced grooves extending into the first major surface and minimizing thermal and mechanical stresses. A door formed with the disclosed polymeric door facing and a method of forming a door facing are also disclosed.

28 Claims, 4 Drawing Sheets

POLYMERIC DOOR FACING WITH TEXTURED INTERIOR SURFACE, AND METHOD OF FORMING SAME

CROSS REFERENCE TO RELATED APPLICATION AND CLAIM TO PRIORITY

This application is based on provisional application Ser. No. 60/683,320, filed May 23, 2005, for David McMahan et al., the disclosure of which is incorporated herein by reference and to which priority is claimed under 35 U.S.C. §120.

FIELD OF THE INVENTION

The present invention relates to a polymeric door facing having a textured interior surface that is resistant to deformation. The interior surface of the door facing includes a series of spaced grooves forming a textured pattern. During formation of the disclosed door facing, a mold die having a plurality of ridges configured for forming the grooves is provided. The ridges increase turbulent flow of the polymer composite used to form the door facing as the composite is compressed and forced over the ridges. Fibers contained in the polymer composite are randomly oriented due to the turbulent flow, which increases rigidity and strength of the door facing.

BACKGROUND OF THE INVENTION

Doors are increasingly being manufactured from polymer components. Door facings may be formed from a polymer composite material, such as sheet molding compound ("SMC"). SMC typically includes unsaturated polyester or vinylester resins, thickening agent, and thermoplastic polymers as low shrinkage or low profile additives, a monomer such as styrene, glass fiber reinforcement and inert filler materials like calcium carbonate. Doors having SMC facings resist rot and corrosion, and are generally better insulators than solid wood, wood composite or metal doors. Because of material costs and manufacturing efficiencies, polymer composite door assemblies are less expensive to manufacture than solid wood doors.

A typical compression molding process used in manufacturing SMC door facings involves placing a predetermined weight of SMC, or an SMC charge, within a lower mold half. An upper mold half is then advanced toward the lower mold half to cause the SMC to conform to the shape of the mold. The mold halves are heated to facilitate flow and affect the thermosetting reaction. For producing a "flush" door facing, the upper and lower mold halves are planar. Alternatively, the mold halves may be configured to produce door facings having a contoured profile, for example simulating a paneled door. In addition, the upper mold half may include a textured pattern simulating a wood grain pattern on the exterior surface of the resulting door facing. For example, the upper mold half may include a series of carefully spaced ridges which simulate wood grain ticks, thereby forming a wood grain pattern in the intended visible exterior surface of the door facing. Such wood grain ticks may be formed in the mold half using etching techniques.

Typical door assemblies include a pair of compression molded door facings which are adhesively secured to a rectangular frame that separates and supports the facings in spaced relationship. A cavity is thus created between the facings which may be filled with a core material, such as polyurethane foam. After the facings are secured to the frame, the resulting semi-finished door may be placed between upper and lower heated platens. The foam material is then injected into the cavity through an opening in the frame. The heated platens exert sufficient pressure on the semi-finished door so that injection of the foam does not loosen or 'blow-out' the facings from the frame. In addition, the platens may be heated to a temperature sufficient to cause the foam to adhere to the interior surfaces of the facings as the foam expands within the cavity.

The door facings may deform due to the temperature gradient between the heated platens and polymeric material forming the door facings, particularly the upwardly disposed door facing (relative to the lower heated platen). If the door facings are not sufficiently rigid, they tend to sag inwardly toward the cavity due to this temperature gradient during door assembly. In addition, the upwardly disposed facing tends to sag inwardly toward the cavity due to gravitational forces. Thus, the door facings must be sufficiently rigid in order to withstand this inward force, or the facings will sag inwardly toward the cavity, a problem sometimes referred to as 'dipping'. Such dipping is particularly prevalent when assembling a 'flush' door (i.e. a door having planar door facings without contours or a wood grain pattern on their visible surfaces). If extensive dipping occurs during the door assembly process, the resulting door will not be commercially viable.

In order to minimize dipping, the facings must be sufficiently rigid. Some conventional methods of increasing rigidity of molded facings provide for increasing the fiber and/or filler content of the compound used to mold the component. Or, the compound may include an additive such as a cross-linking material, in order to increase the modulus of the compound. The resin system chemistry may also be modified by increasing the cross-linking density of the resulting composite, which also increases the modulus of the compound. Alternatively, the caliper of the door facing may be increased. Yet further, relatively large ribs extending outwardly from the major interior surface of the door facing are provided.

While such methods may improve rigidity of the molded component, the compound formulations are relatively expensive. Further, increasing caliper requires an increase in the amount of material used to form the door facing. The use of ribs also requires an increase in the amount of material used. Furthermore, conventional ribs have a tendency to cause the component being molded to stick to the mold cavity, making it more difficult to remove the component therefrom. Thus, manufacturing costs are increased. In addition, increasing caliper tends to increase cycle time requirements, thereby further increasing manufacturing costs.

SUMMARY OF THE INVENTION

The present invention is directed to a door facing formed from a polymeric composite material. The door facing has a first major surface intended to be interiorly disposed and a second major surface intended to be exteriorly disposed. At least a portion of the first major surface will be subjected to thermal and mechanical stresses during door assembly. The first major surface has a textured pattern in the portion to be subjected to thermal and mechanical stresses. The textured pattern includes a plurality of spaced grooves extending into the first major surface and minimizing thermal and mechanical stresses.

The present invention is also directed to a door comprising a perimeter frame and first and second polymeric door facings. The frame has first and second opposite sides. Each door facing has a first major surface secured to a corresponding one of the sides of the perimeter frame, and an exteriorly disposed second major surface. At least a portion of the first major surface of at least one of the door facings is subjected to thermal and mechanical stresses during door assembly. The first major surface has a textured pattern in the portion subjected to thermal and mechanical stresses. The textured pattern includes a plurality of spaced grooves extending into the first major surface and minimizing thermal and mechanical stresses.

The present invention also relates to a method of forming a door facing. A mold press having an upper die and a lower die defining a mold cavity is provided. The lower die has a mold surface having a plurality of spaced ridges extending therefrom. A charge of sheet molding compound is disposed within the mold cavity. The charge is compressed between the upper and lower dies and thereby expanded outwardly toward a periphery of the dies so that the sheet molding compound is forced over the ridges. Turbulent flow of the sheet molding compound is increased as the sheet molding compound is forced over the ridges. A door facing is thereby formed having a plurality of spaced grooves extending into an intended interior major surface. The grooves minimize thermal and mechanical stresses during door assembly.

DETAILED DESCRIPTION OF THE INVENTION

Figure 1:
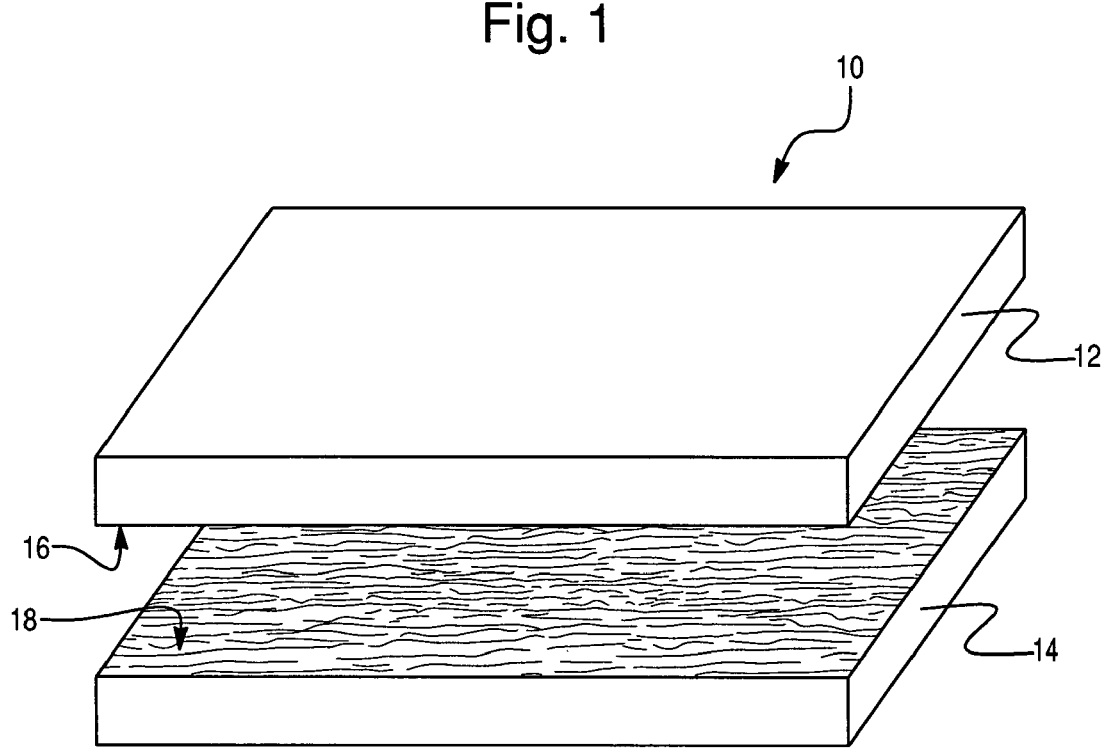
FIG. 1 is a perspective view of a mold press having an upper mold die and a lower mold die according to the present invention.

The mechanical properties and dimensional stability of a molded component are influenced by various aspects of the manufacturing process. Structural characteristics are influenced by the design of the mold cavity, by the location of the charge, and by the various process parameters such as molding temperatures, mold closing speed, and compression cycle time. In addition, the compound's heat conductivity, fiber orientation and distribution, and the resulting caliper of the molded component affect its structural properties. When other processing parameters remain constant, we have surprisingly found that a pattern of grooves formed in the interiorly disposed surface of a door facing increases the rigidity of the facing, compared to a similarly configured door facing that does not include such grooves.

We believe that a mold die having a pattern of ridges, such as achieved with a wood grain pattern, increases turbulent flow of the SMC during compression. This increase in turbulent flow improves heat distribution and conductivity throughout the SMC, and also results in increased random fiber orientation and distribution throughout the door facing. The fibers are less likely to align during compression because the ridges or other texturing of the mold die disrupt the flow of the SMC. In addition, we believe that stresses are more evenly distributed throughout the door facing due to the turbulent flow and random fiber orientation of the SMC. The increased turbulent flow also results in better mixing of the resins and other additives.

For flush door facings having a substantially planar intended visible exterior surface, turbulent flow may be increased by molding a pattern of grooves (or some other texture) into the intended interiorly disposed interior surface of the facing using a mold die having ridges. Rigidity of the door facing is increased and the tendency of the door facing to deform, particularly during door assembly, is reduced due to the random fiber orientation caused by the increased turbulent flow. The specific pattern and configuration of grooves may vary depending on the compound formulation, and the dimensions and caliper of the door facing. However, we have found that if all other manufacturing parameters remain constant aside from texturing, a door facing with a textured interior surface is substantially more rigid than a comparable door facing without a textured interior surface.

As a result, we have found that by texturing the interior surface of a door facing, an SMC formulation having a relatively low modulus may be used and still result in a door facing with sufficient rigidity to minimize dipping during door assembly. For example, an SMC formulation having a modulus of about 1.8 million psi is typically used to form flush door facings without any texturing on either the visible or interior surfaces. If the modulus of the formulation is less than about 1.7 million psi, the resulting door facings are more prone to dipping and other defects. However, if texturing is added to the interior surface of the door facing, an SMC formulation having a relatively low modulus, for example a modulus of between about 1.1 million psi to about 1.4 million psi, may be used and result in door facings which are sufficiently rigid to resist dipping during the door assembly process.

Thus, texturing the interior surface increases rigidity of the door facing without the need for relatively expensive polymer composite formulations, such as formulations having relatively high fiberglass content or specialized polymer blends. In addition, less material is required to form a door facing having a textured interior surface. The grooves forming the pattern on the interior surface replace material that would otherwise be needed to form the door facing. Thus, material costs are reduced.

Furthermore, texturing of the interior surface reduces blistering. Blistering results from voids formed within the SMC during compression that may be the result of either trapping air or a chemical action within the compound. We believe that the grooves formed within the interior surface of the facing minimize the possibility of trapped air and/or other gases because such gases are more likely to escape through the walls of the grooves. Furthermore, we believe blistering is less likely to occur due to improved heat distribution and random fiber orientation caused by the turbulent flow achieved.

We also believe that the caliper of a door facing may be decreased by texturing its interior surface, when compared to the caliper of a similar door facing without a textured interior surface. For example, a flush door facing without a textured interior surface may have a caliper of between about 0.08 inch to about 0.085 inch, which will provide sufficient rigidity during the door assembly process. However, caliper may be significantly reduced if texturing is added to the interior surface of the door facing, while still maintaining the desired rigidity and strength. Caliper reduction is advantageous because less material is required to form the door facing. In addition, the required cycle time during the compression process decreases as caliper decreases. Alternatively, mold temperature may be decreased with a decrease in caliper. Thus, manufacturing costs are decreased. As such, texturing the interior surface of a door facing is also advantageous for a contoured door facing, such as a one panel or multi-panel door facing, or a door facing having a wood grain pattern on its intended visible surface given caliper may be reduced.

The exact pattern of the texture may vary depending on the SMC formulation used, the caliper and configuration of the resulting door facing, and processing parameters used during compression and door assembly. In addition, the configuration of the grooves, including their length, width and depth, may vary depending on configuration and caliper of the door facing (i.e. flush, multi-panel, etc). The optimal layout and configuration of the grooves forming the pattern may be determined by identifying areas of relatively low strength and areas susceptible to deformation caused by thermal stress and mechanical stress during the door assembly process. Thermal stress in the door facing is caused by temperature gradient; mechanical stress is partially caused by gravity, as noted above. Once such weak areas are identified, a pattern of grooves is added to the interior surface of the door facing in order to strengthen such susceptible areas. Finite element analysis ("FEA") may be used to determine the optimal layout and design of the texture that will strengthen such areas. The texturing pattern, including the width, depth, length and direction of the grooves, may be specific to a particular door design.

Some advantages of the present invention may be more readily understood through reference to the following example, which is provided by way of illustration, and not intended to be limiting of the present invention:

EXAMPLE 1

An SMC formulation was provided having a viscosity of about 40 million cps. A suitable viscosity for the formulation is between about 30 million cps to about 50 million cps. The SMC included glass fibers having a length of between about 0.5 inch to about 1 inch. A suitable SMC formulation is available from Interplastic Corporation, Molding Products Division of South Bend, Ind., such as product name 1027181.

A mold press 10 having an upper die 12 and a lower die 14 was provided, as best shown in FIG. 1. The upper die 12 includes a substantially planar molding surface 16 for forming the planar surface of the intended visible surface of a flush door facing. As best shown in FIGS. 1-4, lower die 14 includes a textured molding surface 18 having a series of spaced ridges 20 for forming a wood grain pattern on the interior surface of the flush door facing. The wood grain texturing was acid etched into the lower die by Mold-Tech, a Standex Company, of Salem, N.H., using pattern number MT#978. Another suitable etching pattern for lower die 14 is available from Custom Etch of New Castle, Pa., pattern CE341R.

Figure 3:
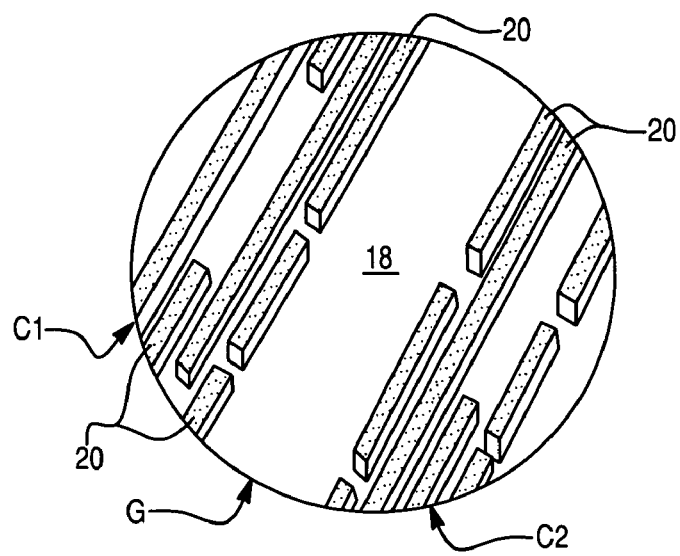
FIG. 3 is an exploded perspective view of circled portion 3-3 of FIG. 2.
Figure 4:
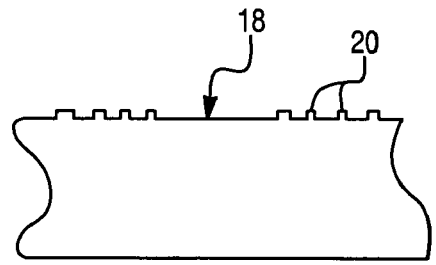
FIG. 4 is a fragmentary cross-sectional view of the lower mold die of FIG. 2.

Spaced ridges 20 extend substantially parallel to each other, as best shown in FIG. 3. However, ridges 20 have variable lengths and widths, and adjacent ridges 20 are spaced from each other by variable distances. Ridges 20 are provided in groups or 'clusters' in order to more accurately simulate a wood grain pattern. For example, a group of ridges 20 are spaced relatively close to each other to form a first cluster C1. Another group of ridges 20 are spaced relatively close to each other to form a second cluster C2. First and second clusters C1, C2 are spaced from each other by a distance greater than the distance that ridges 20 within a particular cluster are spaced, thereby forming a gap G between clusters C1, C2.

The pattern of ridges 20 forming textured molding surface 18 therefore includes a plurality of clusters of ridges 20 (such as clusters C1, C2) and gaps G. Furthermore, clusters may include a variable number of ridges 20, having variable lengths and widths. Clusters may also be variably spaced from each other. We believe this configuration increases flow turbulence because the flow of the SMC is randomly hindered by ridges 20 as the SMC expands during compression due to the variable orientation and configuration of ridges 20.

Figure 2:
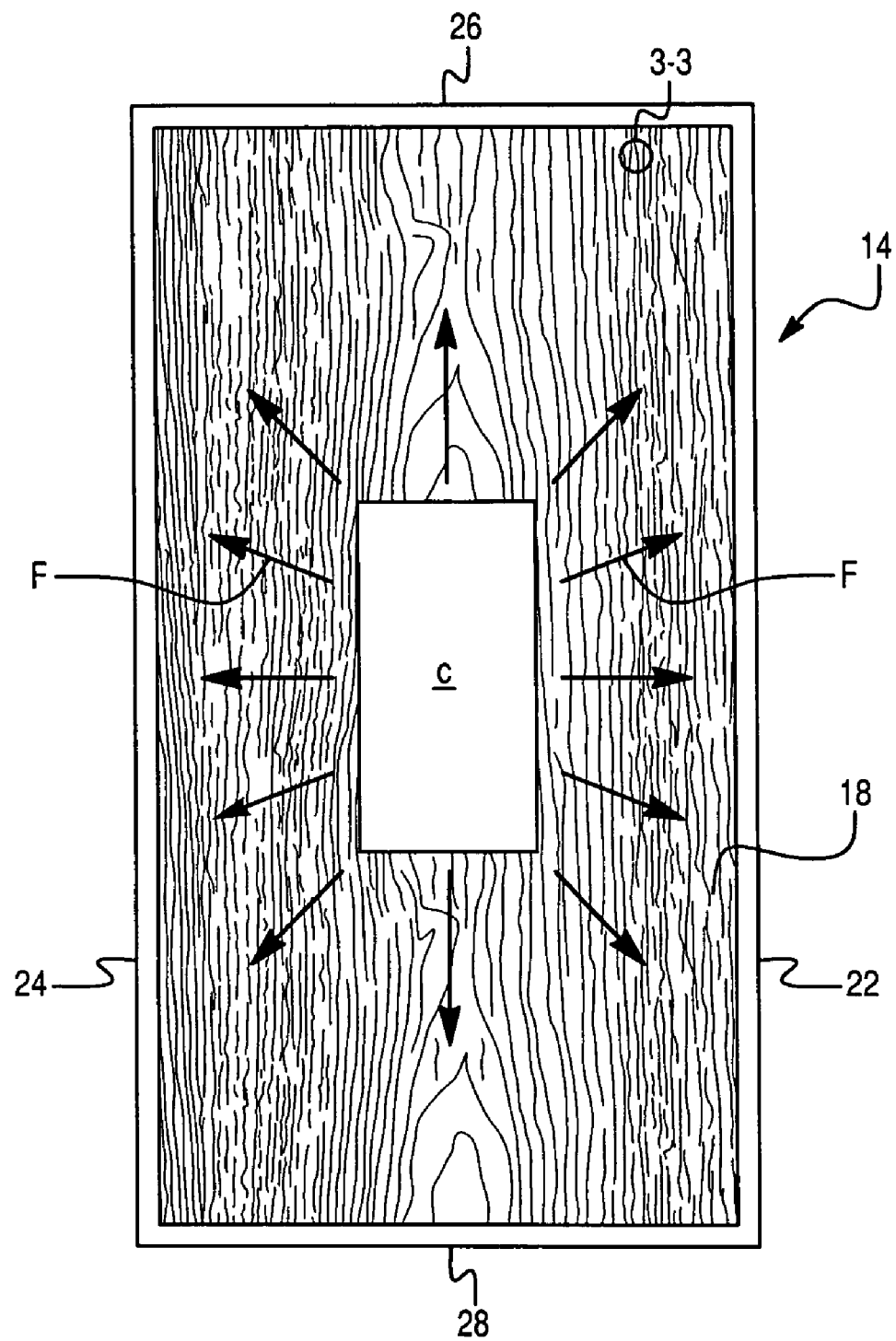
FIG. 2 is a top view of the molding surface of lower mold die of FIG. 1.

As best shown in FIG. 2, the SMC charge C was positioned on textured molding surface 18 of lower die 14 within mold press 10, and compressed to form a flush door facing using sufficient heat and pressure. The intended exterior surface of the molded door facing was substantially planar. The intended interior surface of the resulting door facing included a series of spaced grooves simulating a wood grain pattern having wood ticks as found in natural wood. The spaced grooves were formed by ridges 20 on lower die 14. Thus, the configuration of the interior surface of the resulting door facing is a negative of the configuration of textured mold surface 18.

While the pattern of ridges 20 shown in FIG. 2 appear to be randomly oriented, they extend substantially parallel to each other, and substantially parallel to the longitudinal edges 22, 24 of lower mold die 14. As such, the resulting grooves formed in the door facing will extend substantially parallel to each other, and substantially parallel to the longitudinal edges of the door facing (i.e. parallel to the stiles of the resulting door). During compression molding, the SMC charge C, which is in the shape of one or more billets, is placed onto textured molding surface 18. Planar molding surface 16 of upper die 12 is then advanced toward lower die 14, thus contacting the SMC charge(s) and compressing it therebetween.

During compression, the SMC charge C must spread over the length and width forming the resulting door facing. As such, the SMC charge C must extend throughout the surface area between planar molding surface 16 and textured molding surface 18 which form the door facing before the cross-linking reaction of the SMC is completed. Mold press 10 exerts pressure on the SMC charge C, forcing the SMC to expand outwardly toward the longitudinal edges 22, 24 of lower mold die 14 (and upper mold die 12), as well as toward the ends 26, 28 of lower mold die 14 (and upper mold die 12). The flow direction of the expanding SMC is shown by arrows F. As the SMC expands, it is forced over ridges 20. The flow direction F of a majority of the expanding SMC is angular relative to ridges 20, or even perpendicular to ridges 20. This orientation of ridges 20 relative to the flow direction F is believed to contribute to increased flow turbulence because the flow of the SMC is disrupted as it contacts ridges 20.

Figure 5:
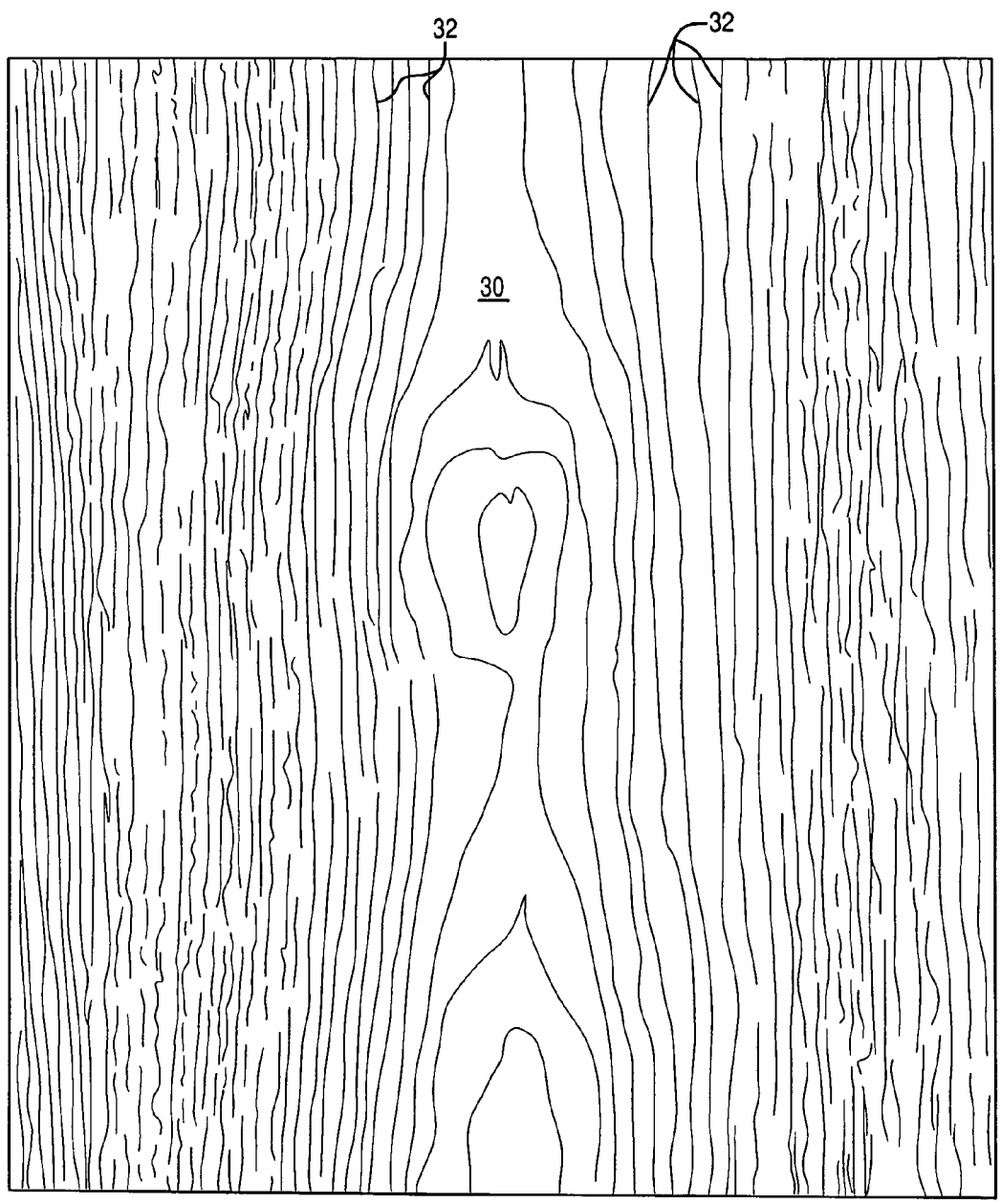
FIG. 5 is a top view of an interior surface of a door facing showing a series of grooves forming a wood grain pattern.

An image of a wood grain pattern is shown in FIG. 5, showing an interior surface 30 of a door facing with grooves 32 formed by ridges 20. Grooves 32 preferably have a depth of between about 0.003 inch to about 0.009 inch, more preferably between about 0.005 inch to about 0.007 inch. As noted above, we believe ridges 20 in lower die 14 increase turbulent flow of the SMC during the compression process, which enhances heat distribution and creates a random distribution and orientation of the glass fibers in the SMC. The resulting door facing has excellent rigidity and strength.

Figure 6:
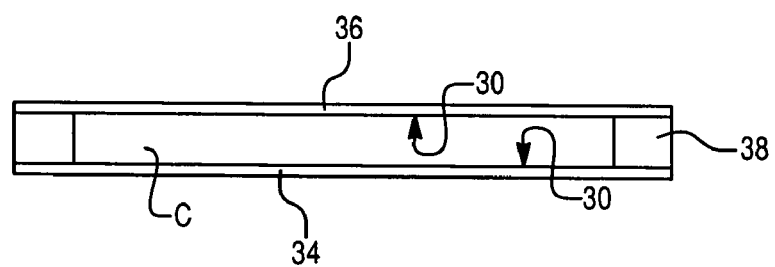
FIG. 6 is a cross-sectional view of a door according to the present invention.

During the door assembly process, first and second door facings 34, 36 were adhesively secured to a perimeter frame 38, forming a cavity C therebetween, as best shown in FIG. 6. Each of facings 34, 36 included interior surface 30 with grooves 32, as best shown in FIG. 5, which are disposed within cavity C. Thus, the resulting door was a flush door, even though each of interior surfaces 30 of facings 34, 36 included a wood grain pattern. The frame 38 and secured facings 34, 36 were disposed between a press having upper and lower heated platens. The platens were heated to a temperature of about 114° F. A suitable temperature range for the platens is between about 110° F. to about 120° F. The frame 38 and secured facings 34, 36 were compressed between the upper and lower heated platens. Polyurethane was then injected into cavity C. As such, upper and lower heated platens applied a sufficient amount of pressure on frame 38 and secured facings 34, 36 so that facings 34, 36 did not deform outwardly or detach from frame 38.

The heat from the platens improves adhesion between the injected foam and interior surfaces 30 of facings 34, 36. In addition, the pattern of grooves 32 on interior surfaces 30 provide a rough surface which enhances foam adhesion. Rigidity of facings 34, 36 is sufficient to avoid deformation or dipping during the door assembly process. Once the foam was sufficiently cured and solidified, the finished door was removed from the press.

A door facing having an interior surface with grooves was compared with a door facing having a substantially planar interior surface. Both door facings were formed from the same formulation of SMC (product 1027181 from Interplastic Corporation, Molding Products Division of South Bend, Ind.). Both facings were approximately 80 inch long by 36 inches wide. In addition, the calipers of both facings were substantially the same. However, the door facing having the textured interior surface 30 with grooves 32 was significantly more rigid and stiff than the facing without such texturing. For example, the loss ratio due to dipping of door facings without texturing is about 80%, while loss ratio due to dipping of door facings with texturing is only about 25% It will be apparent to one of ordinary skill in the art that various modifications and variations can be made in construction or configuration of the present invention without departing from the scope or spirit of the invention. For example, the disclosed example provides for a wood grain pattern on the interior surface of the door facing. However, it should be understood that other textured patterns may be formed in the interior surface of the facing, such as a spiraled pattern, zigzag pattern, grid pattern, or random pattern of grooves. Furthermore, it should be understood that the optimal pattern and groove configuration may be determined based on FEA, and influenced by the precise caliper and dimensions of the component being formed, as well as the specific polymer composite formulation being used. Thus, it is intended that the present invention cover all such modifications and variations, and as may be applied to the central features set forth above.

We claim:

1. A polymeric door facing, comprising:
    a door facing formed from a polymeric composite material and has a modulus of less than about 1.8 million psi, said door facing having
    a first major surface intended to be interiorly disposed and a second major surface intended to he exteriorly disposed,
    at least a portion of said first major surface to be subjected to thermal and mechanical stresses during door assembly,
    said first major surface having a textured pattern in said portion to be subjected to thermal and mechanical stresses,
    said textured pattern including a plurality of spaced grooves extending into said first major surface and minimizing thermal and mechanical stresses.

2. The door facing of claim 1, wherein said door facing is formed from sheet molding compound and has a modulus of between about 1.1 million psi and about 1.4 million psi.

3. The door facing of claim 1, wherein said polymeric composite material includes glass fibers have a length of between about 0.5 inch and about 1.0 inch.

4. The door facing of claim 1, wherein said plurality of grooves have variable lengths and widths.

5. The door facing of claim 4, wherein said plurality of grooves are variably spaced.

6. The door facing of claim 5, wherein said first major surface includes at least first and second clusters of said plurality of spaced grooves.

7. The door facing of claim 6, wherein said plurality of spaced grooves within said first and second clusters are spaced by a first distance, and said first cluster is spaced from said second cluster by a second distance greater than said first distance.

8. The door facing of claim 1, wherein said plurality of spaced grooves have a depth of between about 0.003 inch and about 0.009 inch.

9. The door facing of claim 1, wherein said textured pattern is selected from the group consisting of a wood grain pattern, a spiraled pattern, a zigzag pattern, and a grid pattern.

10. The door facing of claim 1, wherein said door facing has a maximum caliper of less than about 0.08 inch.

11. The door facing of claim 1, wherein said second major surface is substantially planar.

12. The door facing of claim 1, wherein said door facing has longitudinal edges, said plurality of spaced grooves extending substantially parallel to said longitudinal edges.

13. A door, comprising:
    a perimeter frame having first and second opposite sides;
    first and second door facings, at least one of said facings being polymeric, each of said facings having a first major surface secured to a corresponding one of said sides of said perimeter frame and an exteriorly disposed second major surface,
    at least a portion of said first major surface of said at least one polymeric door facing subjected to thermal and mechanical stresses during door assembly,
    said first major surface having a textured pattern in said portion subjected to thermal and mechanical stresses, and
    said textured pattern including a plurality of spaced grooves extending into said first major surface and minimizing thermal and mechanical stresses.

14. The door of claim 13, further comprising a core material disposed within a cavity defined by said first and second door facings.

15. The door of claim 14, wherein said plurality of grooves are variably spaced.

16. The door of claim 13, wherein said at least one polymeric door facing is formed from sheet molding compound and has a modulus of between about 1.1 million psi and about 1.4 million psi.

17. The door of claim 13, wherein said plurality of grooves have variable lengths and widths.

18. The door of claim 13, wherein said plurality of spaced grooves have a depth of between about 0.003 inch and about 0.009 inch.

19. The door of claim 13, wherein said textured pattern is selected from the group consisting of a wood grain pattern, a spiraled pattern, a zigzag pattern, and a grid pattern.

20. The door of claim 13, wherein at least one of said second major surfaces is substantially planar.

21. A method of forming a door facing, comprising the steps of:

providing a mold press having an upper die and a lower die defining a mold cavity, the lower die having a mold surface having a plurality of spaced ridges extending therefrom;

disposing a charge of polymeric composite material within the mold cavity; and compressing said charge between said upper and lower dies and thereby expanding said polymeric composite material outwardly toward a periphery of said dies so that said polymeric composite material is forced over said ridges, wherein turbulent flow of said polymeric composite material is increased as said polymeric composite material is forced over said ridges, thereby forming said door facing having a modulus of less than about 1.8 million psi and having a plurality of spaced grooves extending into an intended interior major surface which minimize thermal and mechanical stresses during door assembly.

22. The method claim 21, including the step of providing said polymeric composite material for said door facing having a modulus of between about 1.1 million psi and about 1.4 million psi.

23. The method of claim 21, including the step of providing said upper die having a substantially planar molding surface.

24. The method of claim 21, including the further steps of:
identifying areas in said door facing to be subjected to thermal and mechanical stresses during door assembly;
determining an optimal pattern for said plurality of ridges for minimizing the thermal and mechanical stresses; and
providing said lower mold die having said determined optimal pattern of ridges.

25. The method of claim 24, wherein finite element analysis is used to determine said optimal pattern during said identifying step.

26. The method of claim 21, wherein a majority of said polymeric composite material expands outwardly and angularly relative to said ridges during said compressing step.

27. The method of claim 21, including the step of providing said polymeric composite material having a viscosity of between about 30 million cps and about 50 million cps during said disposing step.

28. The method of claim 21, including the step of providing said lower die having a mold surface having a plurality of spaced ridges arranged in a pattern selected from the group consisting of a wood grain pattern, a spiraled pattern, a zigzag pattern, and a grid pattern.

* * * * *

UNITED STATES PATENT AND TRADEMARK OFFICE
CERTIFICATE OF CORRECTION

| | | |
|---|---|---|
| PATENT NO. | : 7,690,163 B2 | Page 1 of 1 |
| APPLICATION NO. | : 11/438701 | |
| DATED | : April 6, 2010 | |
| INVENTOR(S) | : David McMahan et al. | |

It is certified that error appears in the above-identified patent and that said Letters Patent is hereby corrected as shown below:

In the Specification

Column 1, line 11, change "35 U.S.C. §120" to read --35 U.S.C. § 119(e)--.

Signed and Sealed this
Fourteenth Day of October, 2014

Michelle K. Lee
*Deputy Director of the United States Patent and Trademark Office*